United States Patent Office 3,434,960
Patented Mar. 25, 1969

3,434,960
LOW-PRESSURE REFORMING PROCESS WITH A PLATINUM-RHENIUM CATALYST
Robert L. Jacobson, Pinole, Harris E. Kluksdahl, San Rafael, and Burwell Spurlock, Lafayette, Calif., assignors to Chevron Research Company, San Francisco, Calif., a corporation of Delaware
Filed June 30, 1967, Ser. No. 650,542
Int. Cl. C10g 35/08
U.S. Cl. 208—138
13 Claims

ABSTRACT OF THE DISCLOSURE

Reforming a naphtha in the presence of hydrogen at low pressures to produce at least 98 F–1 clear octane gasoline with a catalyst composition of a porous inorganic oxide carrier containing 0.01 to 1.0 weight percent platinum and 0.01 to 2.0 weight percent rhenium. The pressure is maintained below 250 p.s.i.g., and the feed rate is at least 2 LHSV. The hydrogen to hydrocarbon mole ratio is related to the distillation properties of the naphtha processed and to the octane number of the gasoline produced. The reforming process operates on stream for at least 2000 hours with no greater than a 2 volume percent decline in the gasoline yield in 2000 hours.

BACKGROUND OF THE INVENTION

Field

This invention relates to hydrocarbon reforming processes. More particularly, the present invention is concerned with reforming processes conducted at low pressures to produce high octane gasolines.

Prior art

Reforming is well known in the petroleum industry and refers to the treatment of naphtha fractions in the presence of hydrogen and a catalyst having dehydrogenation activity to improve the octane rating. During a period of use the catalyst decreases in activity for several reasons, one of which is the deposition of carbon and carbonaceous material thereon. Thus, the catalyst must be replaced periodically; or, more desirably, the catalyst must be regenerated periodically by heating it to a high temperature, for example, in the presence of an oxygen-containing gas, to restore at least part of the original catalytic activity. Hence, reforming processes can be broadly classified according to the on-stream period of operation permissible before replacement of the used catalyst with fresh catalyst, or regeneration of the used catalyst, as the case may be. The process of the present invention is to be distinguished from reforming processes which operate for on-stream periods of use before regeneration of only a few hours or a few days. The present invention relates to reforming processes wherein the catalyst is contacted with a naphtha for a period of at least 2000 hours before replacement or regeneration.

Most catalytic reforming processes which run for long on-stream periods of time operate at high reaction pressures, e.g. at pressures greater than 350 p.s.i.g. and more particularly at pressures from 400 to 500 p.s.i.g. High pressures have heretofore been necessary in order to control coke deposition and catalyst deactivation. When reforming at low pressures, e.g. below 250 p.s.i.g., to produce high quality gasoline of at least 98 octane, conventional catalysts heretofore used have rapidly fouled, i.e., become deactivated, thereby preventing the reforming processes from operating for on-stream periods of greater than 2000 hours with reasonable $C_5+$ liquid yield declines, e.g. $C_5+$ liquid yield declines of no greater than 2 volume percent over a period of 2000 hours. It is recognized in the petroleum industry, however, that catalytic reforming processes at low pressures result in substantial increases in yield of gasoline products of high octane rating. Thus, extensive research has been devoted to the development of low pressure reforming processes and catalysts for use therein. In view of the increased demand for high octane gasolines and particularly in view of the public pressure to prohibit the use of lead in gasolines to increase octane rating, the development of low pressure reforming processes has increased in importance.

Catalysts generally used for reforming processes contain platinum supported on porous solid carriers, e.g. alumina. It is possible to operate reforming processes with supported platinum catalysts at low pressures for long on-stream periods of time, e.g. greater than 2000 hours, but only with catalyst compositions and/or reforming conditions that make the processes economically unattractive. Thus, extremely high levels of platinum, e.g., greater than 1 weight percent, can be used on a catalyst, thereby enabling a reforming process to be conducted at low pressures to produce high octane gasolines. The cost of platinum, however, makes this avenue of approach to low pressure reforming unattractive. Other approaches to low pressure reforming include lowering the liquid hourly space velocity or increasing the hydrogen to hydrocarbon mole ratio; these approaches are undesirable because of the decrease in feed processed in the first instance and because of the high cost incurred in recirculating hydrogen at low pressures in the second instance. It is apparent, therefore, that low pressure reforming processes to produce high octane gasoline for long on-stream periods of operation have heretofore been plagued with difficulties which have effectively prevented said low pressure reforming from being commercially practical.

SUMMARY OF THE INVENTION

In application Ser. No. 560,166, filed June 24, 1966 now abandoned and application Ser. No. 639,719, filed May 19, 1967, a novel catalytic composition useful for reforming processes was described. The catalyst described in the above-identified applications comprises a porous solid carrier support having disposed therein in intimate admixture platinum and rhenium. Furthermore, the catalyst is described as having increased selectivity and stability over a catalyst comprising platinum without rhenium when reforming a sulfur-free naphtha fraction. The description of the catalyst in the above-stated applications is incorporated herein as part of this application by reference thereto.

It has now been found that the catalyst composition comprising platinum and rhenium supported on a porous solid catalyst carrier is especially suitable for low pressure-high severity reforming, i.e., reforming at pressures below 250 p.s.i.g., to produce a gasoline products having an F–1 clear octane number of at least 98. The present inventive process for catalytically reforming a naphtha to obtain a reformate having an F–1 clear octane number of at least 98 comprises contacting said naphtha and hydrogen with a porous inorganic oxide carrier containing from 0.01 to 1 weight percent platinum promoted with 0.01 to 2 weight percent rhenium at reforming conditions including a pressure of less than 250 p.s.i.g., a liquid hourly space velocity of at least 2, and a hydrogen to hydrocarbon mole ratio ($H_2$/HC) less than the value determined from the equation $$\log H_2/HC = 0.0062x - k$$

where $x$ is the temperature at which 95 volume percent of said naphtha had been distilled during an ASTM D–86 distillation, and where $k$ depends on the F–1 clear octane number (O.N.) of the reformate being produced according to the equation $$k = -0.038(O.N.) + 5.10$$

The process is characterized by an on-stream period of at least 2000 hours with a $C_5+$ liquid yield decline of no greater than 2 volume percent over 2000 hours. The process is particularly suitable for use with alumina as the porous inorganic oxide carrier.

As a specific embodiment, the process of the present invention comprises catalytically reforming a naphtha, the temperature at which 95 volume percent of said naphtha distilled during an ASTM D–86 distillation being from 340° F. to 370° F., to obtain a reformate having an F–1 clear octane number of at least 98, the process being characterized by an on-stream period of at least 2000 hours with a $C_5+$ liquid yield decline of no greater than 2 volume percent over 2000 hours, by contacting said naphtha and hydrogen with a catalyst comprising a porous inorganic oxide carrier containing from 0.01 to 1 weight percent platinum promoted with 0.01 to 2 weight percent rhenium at reforming conditions including a pressure of less than 250 p.s.i.g., a liquid hoursly space velocity of at least 2, and a hydrogen to hydrocarbon mole ratio of less than 5.4 when a reformate having an F–1 clear octane number of 98 is being produced and being increased by about ⅔ mole of hydrogen per octane number as the F–1 clear octane number of the reformate being produced is raised from 98 to 104.

BRIEF DESCRIPTION OF THE DRAWINGS

The present invention can be better understood and will be further explained hereinafter with reference to the graphs in FIGURES 1, 2 and 3.

The graph in FIGURE 1 shows, as a function of the temperature at which 95 volume percent of a naphtha distilled during as ASTM D–86 distillation (often referred to hereinafter as the 95% boiling point temperature), the hydrogen to hydrocarbon ($H_2$/HC) mole ratio necessary to reform a naphtha to a gasoline product of a specified octane number using a catalyst comprising platinum and rhenium (curve 1) and a catalyst comprising platinum without rhenium (curves 2 through 4). The curves in FIGURE 1 are based on correlations of the F–1 clear octane number of the product, the hydrogen to hydrocarbon mole ratio, and the 95% boiling point temperature of the naphtha for reforming at a pressure of 250 p.s.i.g. and a liquid hourly space velocity of 2. Curves 1 and 2 are for reforming processes to produce a gasoline having an F–1 clear octante number of 98. Curves 3 and 4 are for reforming processes to produce a gasoline product having an F–1 clear octane number of 100 and 102, respectively.

Figure 2:
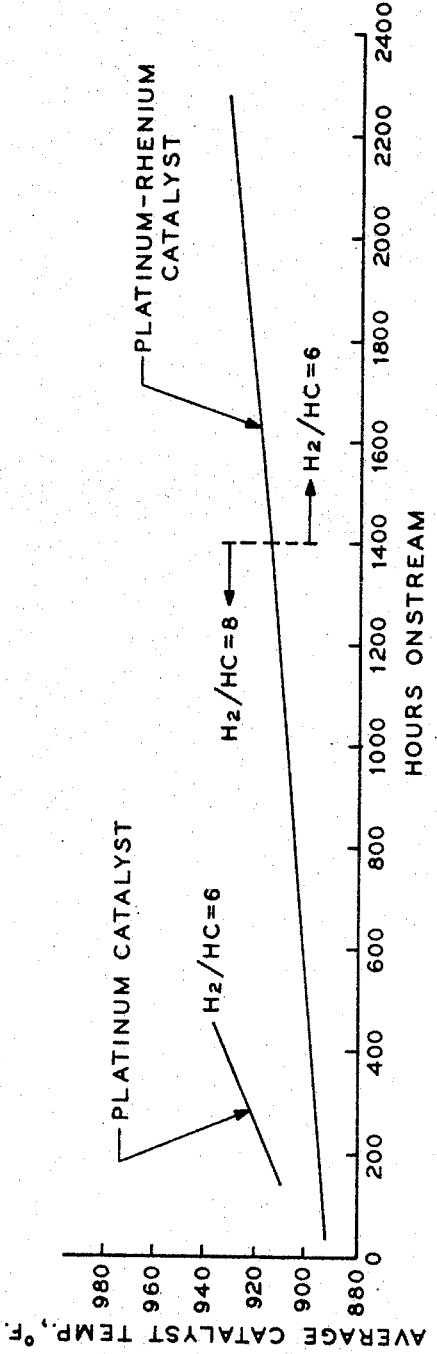
Figure 3:
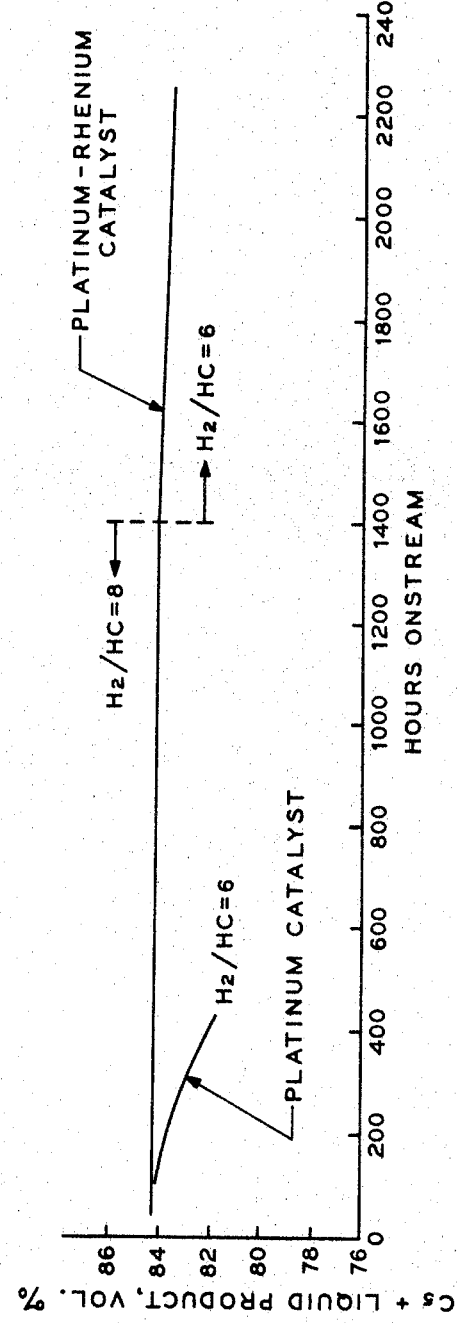

The graphs in FIGURES 2 and 3 show for comparison purposes the reforming performance of a conventional catalyst comprising platinum on an alumina support, and a catalyst comprising platinum and rhenium on an alumina support. The conditions of operation for the reforming process using the supported platinum catalyst included a pressure of 200 p.s.i.g. and a hydrogen to hydrocarbon ratio of 6. The conditions of operation for the reforming process using the supported platinum-rhenium catalyst included a pressure of 200 p.s.i.g. and a hydrogen to hydrocarbon mole ratio of 8 for the first 1400 hours on-stream operation and thereafter a hydrogen to hydrocarbon mole ratio of 6. The liquid hourly space velocity for both reforming processes was the same and was at least 2. The graph in FIGURE 2 shows, as a function of on-stream time, the average catalyst temperature necessary to maintain a product having an F–1 clear octane number of 100. The graph in FIGURE 3 shows, as a function of on-stream time, the $C_5+$ liquid yield, expressed in volume percent, of 100 F–1 clear octane gasoline produced. The marked superior performance of the reforming process using the supported platinum-rhenium catalyst over that of the reforming process using the platinum catalyst without rhenium is evident from FIGURES 2 and 3.

DESCRIPTION OF THE INVENTION

The catalyst which finds use in the low pressure-high severity reforming process of the present invention comprises a porous inorganic oxide carrier or support containing from 0.01 to 1 weight percent platinum promoted with 0.01 to 2 weight percent rhenium. Porous inorganic oxide carriers or supports which find use in the present invention include a large number of materials upon which the catalytically active amounts of platinum and rhenium can be disposed. By "porous" inorganic oxide support is meant an inorganic oxide having a surface area preferably from 50 to 700 m.²/gm. and more preferably from 150 to 700 m.²/gm. The support can be naturally or synthetically produced inorganic oxides or combinations of inorganic oxides. Typical acidic inorganic oxide supports which can be used are the naturally occurring aluminosilicates, particularly when acid treated to increase the activity, and the synthetically produced cracking supports, such as silica-alumina, silica-zirconia, silica-alumina-zirconia, silica-magnesia, silica-alumina-magnesia, and crystalline zeolitic aluminosilicates. Generally, however, reforming processes are preferably conducted in the presence of catalysts having a low cracking activity, i.e., catalysts of limited acidity. Hence, preferred catalysts are inorganic oxides such as magnesia and alumina.

The catalytic carrier or support which is particularly preferred for purposes of this invention is alumina. Any of the forms of alumina suitable as supports for reforming catalysts can be used. Furthermore, alumina can be prepared by a variety of methods satisfactory for purposes of this invention. The preparation of alumina for use in reforming catalysts is well known in the art.

The platinum and rhenium are disposed in intimate admixture with each other on the porous inorganic oxide catalyst support. The platinum and rhenium can be disposed on the porous inorganic oxide support in intimate admixture with each other by suitable techniques such as ion-exchange, coprecipitation, impregnation, etc. One of the metals can be associated with the carrier by one procedure, for example ion-exchange, and the other metal associated with the carrier by another procedure, e.g., impregnation. However, the metals are usually associated with the porous inorganic oxide support by impregnation. The catalyst can be prepared either by coimpregnation of the metals onto the porous inorganic oxide carrier or by sequential impregnation. In general, the carrier material is impregnated with an aqueous solution of a decomposable compound of the metal in sufficient concentration to provide the desired quantity of metal in the finished catalyst; the resulting mixture is then heated to remove water. Chloroplatinic acid is generally the preferred source of platinum. Other feasible platinum-containing compounds, e.g., ammonium chloroplatinates and polyammineplatinum salts, can also be used. Rhenium compounds suitable for incorporation onto the carrier include, among others, perrhenic acid and ammonium perrhenates.

It is contemplated in the present invention that incorporation of the metals with the carrier can be accomplished at any particular stage of the catalyst preparation. For example, if the metals are to be incorporated onto an alumina support, the incorporation may take place while the alumina is in the sol or gel form followed by precipitation of the alumina. Alternatively, a previously prepared alumina carrier can be impregnated with a water solution of the metal compounds. Regardless of the method of preparation of the supported platinum-rhenium catalyst it is desired that the platinum and rhenium be in intimate admixture with each other on the support and furthermore that the platinum and rhenium be intimately dispersed throughout the porous inorganic oxide catalyst support.

The catalyst proposed for the low pressure-high severity reforming process of the present invention comprises platinum in an amount from about 0.01 to 1 weight percent, more preferably from about 0.2 to 1 weight percent, and most preferably 0.4 to 1 weight percent based on the finished catalyst. Concentrations of platinum below about 0.01 weight percent are too low for satisfactory reforming operations. On the other hand, concentrations of platinum greater than about 1 weight percent are generally unsatisfactory because of the high cost of the platinum metal. As indicated previously higher concentrations of platinum, i.e., greater than 1 weight percent, could be used for low pressure-high severity reforming but the reforming process is generally considered economically unattractive because of the high platinum level required. The concentration of rhenium in the finished catalyst composition is preferably from 0.01 to 2 weight percent and more preferably 0.1 to 1.5 weight percent and still more preferably 0.1 to 1.0 weight percent. Higher concentrations of rhenium could advantageously be used but the cost of rhenium limits the amount incorporated on the catalyst. It is preferred that the rhenium to platinum atom ratio shall be from about 0.2 to 2 and still more particularly it is preferred that the atom ratio of rhenium to platinum does not exceed 1. Higher ratios, that is, greater than 1, of rhenium to platinum can be used but generally no significant improvement is obtained.

Following incorporation of the porous inorganic oxide with platinum and rhenium, the resulting composite is usually dried by heating at a temperature of, e.g., no greater than about 500° F. and preferably at about 200° F. to 400° F. Thereafter the composite can be calcined at an elevated temperature, e.g., up to about 1200° F., if desired.

The carrier containing platinum and rhenium is preferably heated at an elevated temperature to convert the platinum and rhenium to the metallic state. Preferably the heating is performed in the presence of hydrogen, and more preferably in the presence of dry hydrogen. In particular, it is preferred that this prereduction be accomplished at a temperature in the range of 600° F. to 1300° F., and preferably 600° F. to 1000° F. Furthermore the catalyst of the present invention preferably exists during the reforming process with the platinum and rhenium in the metallic state. Thus, generally regardless of whether or not the platinum and rhenium are prereduced to the metallic state prior to contact with naphtha at the low pressure reforming conditions, the metals will be converted to the metallic state during the reforming process when sulfur is excluded from the feed.

The catalyst composite of the present invention, i.e., platinum and rhenium supported on a porous inorganic oxide carrier, can be sulfided prior to contact with the naphtha to be reformed. The presulfiding can be done in situ or ex situ by passing a sulfur-containing gas, e.g., $H_2S$, through the catalyst bed. Other presulfiding techniques are known in the prior art. Furthermore, the catalyst can be sulfided on startup by adding a sulfur-containing compound, e.g., $H_2S$ or dimethyldisulfide, to the reforming zone in the presence of the naphtha. The exact form of the sulfur used in the sulfiding process is not critical. The sulfur can be introduced to the reaction zone in any convenient manner and at any convenient location. It can be contained in the liquid hydrocarbon feed, the hydrogen rich gas, the recycle liquid stream or a recycle gas stream or any combination. After operating the reforming process in the presence of sulfur for a period of time short in comparison to the over-all run length which can be obtained with the catalyst, the addition of sulfur is preferably discontinued. The purpose for presulfiding the catalyst prior to contact with the naphtha or sulfiding the catalyst during the initial contact with naphtha is to reduce the initial excessive hydrocracking activity of the catalyst which results in the production of high yields of light hydrocarbon gases, e.g., methane, during the early part of the reforming process.

The catalyst can be promoted for reforming by the addition of halides, particularly fluoride or chloride. The halides apparently provide a limited amount of acidity to the catalyst which is beneficial to most reforming operations. The catalyst promoted with halide preferably contains from 0.1 to 3 weight percent total halide content and preferably from 0.1 to 2 weight percent. The halides can be incorporated onto the catalyst carrier at any suitable stage of catalyst manufacture, e.g., prior to or following incorporation of the platinum and rhenium. Some halide is often incorporated onto the carrier when impregnating with the metals; e.g., impregnation with chloroplatinic acid normally results in chloride addition to the carrier. Additional halide can be incorporated onto the support simultaneously with incorporation of the metal if so desired. In general, halides are combined with the catalyst carrier by contacting suitable compounds such as hydrogen fluoride, ammonium fluoride, hydrogen chloride, or ammonium chloride, either in the gaseous form or in a water soluble form with the carrier. Preferably, the fluoride or chloride is incorporated onto the carrier from an aqueous solution containing the halide.

The feedstock to be employed in the reforming operation is a light hydrocarbon oil, for example, a naphtha fraction. Generally, the naphtha will boil in the range falling within the limits of from about 70° to 550° F. and preferably from 150° to 450° F. The feedstock can be, for example, either a straight-run naphtha or a thermally cracked or catalytically cracked naphtha or blends thereof. Preferably the naphtha is a hydrogenated naphtha, for example, a hydrocracked naphtha. The feed for purposes of the present invention will preferably have a temperature at which 95 volume percent had been distilled during an ASTM D-86 distillation ("ASTM Standards," Petroleum Products—Fuels, Solvents, Engine Tests, Lubricating Oils, Cutting Oils, Grease, part 17, 1965) at least 300° F. but not greater than 400° F., and more preferably from 320° F. to 380° F., and most preferably from 340° F., to about 370° F. That is, for a naphtha fraction preferably finding use for purposes of the present invention, 95 volume percent of said naphtha will have been distilled during an ASTM D-86 distillation at a temperature falling within the preferred ranges specified above. It is preferred to characterize the boiling point of the feed in terms of the temperature at which 95 volume percent of the feed had been distilled during ASTM D-86 distillation since this temperature is more reproducible than the true end point of the feed and more indicative of the boiling characteristics of the feed. A naphtha fraction often contains small amounts of high boiling components; thus the end boiling point of the feed, as measured by an ASTM distillation, will be very high, and not indicative of where the bulk of the naphtha distills.

It is preferred that the feed for purposes of the present invention be substantially sulfur free; that is, the feed should preferably contain less than about 10 p.p.m. sulfur, and more preferably less than 5 p.p.m., and still more preferably, less than 1 p.p.m. In the case of a feedstock which is not already low in sulfur, accepted levels can be reached by hydrogenating the feedback in a presaturation zone where the naphtha is contacted with a hydrogenation catalyst which is resistant to sulfur poisoning. A suitable catalyst for this hydrodesulfurization process is, for example, an alumina-containing support and a minor proportion of molybdenum oxide and cobalt oxide. Hydrodesulfurization is ordinarily conducted at a temperature from 750° F. to 850° F., a pressure from 200 to 2000 p.s.i.g., and a liquid hourly space velocity from 1 to 5. The sulfur contained in the naphtha is generally converted to hydrogen sulfide which can be removed prior to reforming by suitable conventional processes.

The present inventive low pressure reforming process is characterized by the production of a gasoline product having an F-1 clear octane number of at least 98 for a period of at least 2000 hours with a $C_5+$ liquid yield decline of no greater than 2 volume percent over 2000 hours. An on-stream period of reforming, e.g., the period of time before replacement or regeneration is required, of less than 2000 hours is not generally economically attractive. For example, the expense involved in shutting down a reactor to regenerate the catalyst either in situ or ex situ prohibits too frequent regenerations, i.e. regenerations after less than 2000 hours on-stream time. Too frequent regenerations are undesirable not only because of materials and manpower involved during regeneration but also because of the time lost in producing high octane gasolines. Furthermore, a $C_5+$ liquid yield decline of greater than 2 volume percent over 2000 hours is generally considered uneconomical for a reforming process. If the gasoline liquid yield, that is the $C_5+$ liquid yield, decreases at a rate greater than 2 volume percent over 2000 hours then the catalyst is fouling too rapidly, thereby necessitating too frequent replacements or regenerations of the catalyst to restore catalytic activity. The reforming process of the present invention can operate for a period far in excess of 2000 hours if desired. However, for purposes of the present invention, the reforming process is characterized by a $C_5+$ liquid yield decline of no greater than 2 volume percent measured for the first 2000 hours of reforming. Thus, for example, a reforming process wherein the on-stream period of time is 4000 hours and the $C_5+$ liquid yield decline over the 4000 hour period is greater than 2 volume percent is still economically attractive and the process falls within the present invention if the $C_5+$ liquid yield decline for the first 2000 hours is no greater than 2 volume percent.

As a particular embodiment of the present invention it is preferred that the process be characterized by an on-stream period of at least 2600 hours with a $C_5+$ liquid yield decline of no greater than 2 volume percent over 2600 hours. Thus, the longer the reforming process can operate between catalyst replacements or regenerations with only a 2 volume percent $C_5+$ liquid yield decline, the more economical in general is the process. The hydrogen to hydrocarbon mole ratio must generally be increased when the other reforming conditions remain unchanged in order to obtain longer on-stream periods of use.

The pressure in the reforming reaction zone for purposes of the present invention is less than 250 p.s.i.g. Preferably, the pressure will be at least 75 p.s.i.g., but less than 250 p.s.i.g. and more preferably, at least 125 p.s.i.g., but less than 250 p.s.i.g. The pressure is determined as the average reactor pressure. Thus, for example, in a process where several reactors are in series, with the feed flowing from the outlet of one reactor to the inlet of another reactor, the pressure of the reforming process, i.e., the pressure of less than 250 p.s.i.g., will be the average of the pressures throughout the several reactors.

The feed rate for use in the present invention, i.e. the liquid hourly space velocity (LHSV), is at least 2.0. High space rates, i.e. at least 2.0, permit greater volumes of feed to be processed, thus adding to the economics of the reforming process. Preferably the feed rate is at an LHSV from 2 to 6 and more preferably from 2 to 4.

The temperature in the reforming process will generally be within the range of 600° F. to 1100° F. and preferably about 700° F. to 1050° F. The temperature will be determined, however, by the other operating conditions; that is, at a particular pressure, liquid hourly space velocity and hydrogen to hydrocarbon ratio, the temperature is determined by the desired octane number of the product to be produced.

Reforming generally results in the production of hydrogen. Thus, excess hydrogen need not necessarily be added to the reforming process. However, it is usually preferred to introduce excess hydrogen at some stage of the operation, as, for example, during startup. The hydrogen can be introduced into the feed prior to contact with the catalyst or can be contacted simultaneously with the introduction of feed to the reaction zone. Generally, hydrogen is recirculated over the catalyst prior to contact of the feed with the catalyst.

Reforming of a naphtha fraction is accomplished by contacting the naphtha and hydrogen at reforming conditions with the desired catalyst. The hydrogen can be in admixture with light gaseous hydrocarbons, for example, methane. Hydrogen serves to reduce the formation of coke which tends to poison the catalyst. Moreover, the presence of hydrogen can be used to favor certain reforming reactions such as isomerization, dehydrogenation, or hydrocracking. Generally, hydrogen is recovered from the reaction products and is generally purified and recycled to the reaction zone. The hydrogen to hydrocarbon mole ratio required for purposes of the present invention is measured at the inlet of the reactor and in the case of several reactor in series, at the inlet of the first reactor.

For purposes of the present invention, the hydrogen to hydrocarbon mole ratio ($H_2/HC$) should be less than the value determined by the relationship $$\log H_2/HC = 0.0062x - k$$

where $x$ is the temperature at which 95 volume percent of the naphtha had been distilled during ASTM D-86 distillation and where $k$ is defined in terms of the F-1 clear octane number (O.N.) of the gasoline or reformate produced according to the relationship $$k = -0.038(O.N.) + 5.10$$

Thus, the maximum hydrogen to hydrocarbon mole ratio permissible for purposes of the present invention will vary depending upon the 95% boiling point temperature of the feed being reformed and upon the F-1 clear octane number of the reformate being produced in accordance with the above equations. At hydrogen to hydrocarbon mole ratios less than the value determined from the above equations and at the other reforming conditions specified for the present invention, i.e., a pressure less than 250 p.s.i.g., and an LHSV of at least 2, reforming processes to produce at least 98 F-1 clear octane gasoline using a platinum catalyst comprising no more than 1.0 weight percent platinum but without rhenium will not be characterized by an on-stream period of operation of at least 2000 hours with a $C_5+$ liquid yield decline of no greater than 2 volume percent over 2000 hours.

Figure 1:
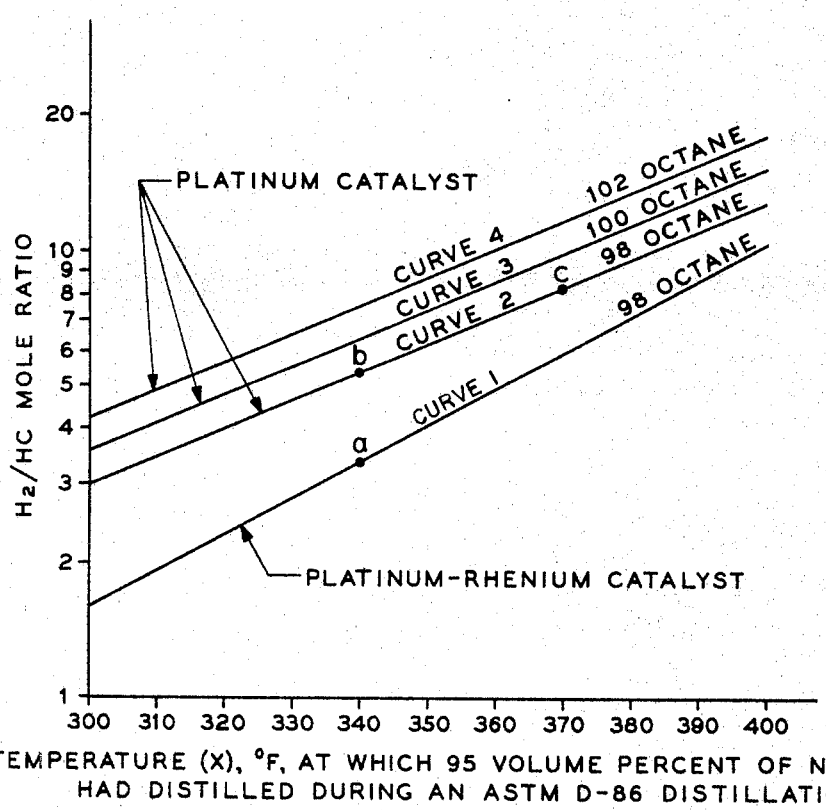

The relationship of the hydrogen to hydracarbon mole ratio to the 95% boiling point temperature of the feed and the octane number of the gasoline product can be better understood by reference to FIGURE 1. The graph in FIGURE 1 shows the relationship between the hydrogen to hydrocarbon mole ratio required to produce a gasoline product of a desired octane number and the temperature at which 95 volume percent of naphtha distilled during an ASTM D-86 distillation. The curves (curves 1 through 4) were obtained from correlations of the hydrogen to hydrocarbon mole ratio, the F-1 clear octane number of the product produced and the 95% boiling point temperature of the feed for reforming at a liquid hourly space velocity of 2 and a pressure of 250 p.s.i.g. The reforming process was characterized by an on-stream period of 2000 hours with a $C_5+$ liquid yield decline of 2 volume percent over the 2000 hours. Curve 1 is based on a reforming process to produce a 98 F-1 clear octane number gasoline using a catalyst comprising alumina containing platinum and rhenium wherein the platinum content is about 0.6 weight percent and the rhenium content is about 0.6 weight percent based on the final catalyst composition. Curves 2, 3, and 4 are based on reforming processes using catalysts comprising alumina containing about 1.0 weight percent platinum without rhenium to produce F-1 clear octane number gasolines of 98, 100, and 102, respectively.

Curve 2 of FIGURE 1 is defined by the equation $$\log H_2/HC = 0.0062x - k$$

where $k$ equals 1.38 and where $x$ is the 95% boiling point temperature of the feed. This relationship between the hydrogen to hydrocarbon mole ratio and the 95% boiling point temperature of the feed is for a reforming process using a catalyst comprising 1.0 weight percent platinum and containing no rhenium and wherein the pressure is 250 p.s.i.g. and the liquid hourly space velocity is 2. The hydrogen to hydrocrabon mole ratio determined from the above equation for a particular feedstock is the lowest hydrogen to hydrocarbon mole ratio that can be used and still have a low pressure-high severity reforming process using a platinum catalyst without rhenium to produce a 98 F-1 clear octane gasoline product for an on-stream period of time of at least 2000 hours with a $C_5+$ liquid yield decline of no greater than 2 volume percent over 2000 hours. At lower hydrogen to hydrocarbon mole ratios, the process using a platinum catalyst without rhenium will not operate for the desired length of time with the desired low yield decline. Furthermore, a decrease in the pressure to lower than 250 p.s.i.g. will require an increase in the hydrogen to hydrocarbon mole ratio to obtain the same conversion to 98 octane gasoline. Likewise, increasing the space velocity to greater than 2 will require an increase in the hydrogen to hydrocarbon mole ratio to obtain the same conversion to 98 octane gasoline. Decreasing the platinum concentration in the catalyst to a value less than 1 weight percent will also necessitate an increase in the hydrogen to hydrocarbon mole ratio to obtain the desired conversion. Thus, it is apparent that the above expression for the hydrogen to hydrocarbon mole ratio to produce a 98 F-1 clear octane gasoline product ($k$ equals 1.38) gives the lowest tolerable hydrogen to hydrocarbon mole ratio for a reforming process using a platinum catalyst comprising no more than 1 weight percent platinum and operated at reforming conditions including a pressure of less than 250 p.s.i.g. and a liquid hourly space velocity of at least 2 and with the desired run length time and yield decline.

An increase in the hydrogen to hydrocarbon mole ratio is necessary in order to increase the octane number of the gasoline fraction produced during reforming while maintaining the LHSV and the pressure constant, e.g. at an LHSV of 2 and a pressure of 250 p.s.i.g. Thus, referring to FIGURE 1, curves 3 and 4 show the relationship of the hydrogen to hydrocarbon mole ratio to the 95% boiling point temperature to obtain 100 F-1 clear octane gasoline and 102 F-1 clear octane gasoline, respectively, when reforming with a platinum catalyst. The reforming conditions other than the hydrogen to hydrocarbon mole ratio are the same for curves 2, 3 and 4. A logarithmic expression similar to that used to define curve 2 can be used to define curves 3 and 4, but with a different value for $k$. $k$ will vary according to the octane number of the product produced according to the expression:

$$k = -0.038(O.N.) + 5.10$$

The value of $k$ decreases from a value of about 1.38 for an octane number of 98 to a value of about 1.20 for an octane number of 102.

Referring to curve 1 of FIGURE 1, it is noted, by way of example, that reforming a naphtha having a temperature at which 95 volume percent had distilled during an ASTM D-86 distillation of 340° F., at reforming conditions including a pressure of 250 p.s.i.g. and a liquid hourly space velocity of 2, to produce a gasoline product having an F-1 clear octane number of 98, requires a hydrogen to hydrocarbon mole ratio of at least 3.4 when using a catalyst comprising 0.6 weight percent platinum and 0.6 weight percent rhenium in order for the process to be characterized by an on-stream period of time of at least 2000 hours with a $C_5+$ liquid yield decline of no greater than 2 volume percent over 2000 hours (point $a$ on curve 1). On the other hand, when reforming a similar feed at similar reforming conditions to produce a 98 F-1 clear octane number product using a catalyst comprising 1 weight percent platinum with no rhenium, a hydrogen to hydrocarbon mole ratio of at least 5.4 is required in order for the reforming process to be characterized by an on-stream period of time of at least 2000 hours with a $C_5+$ liquid yield decline of no greater than 2 volume percent over 2000 hours (point $b$ on curve 2).

As a preferred embodiment of the present invention, a naphtha feed having a temperature at which 95 volume percent had been distilled during an ASTM D-86 distillation falling within the range from 340° F. to 370° F. can be reformed to obtain a reformate having an F-1 clear octane number of at least 98 throughout an on-stream period of operation of at least 2000 hours with a $C_5+$ liquid yield decline of no greater than 2 volume percent over 2000 hours. The naphtha feed and hydrogen are contacted with a supported platinum-rhenium catalyst containing from 0.01 to 1.0 weight percent platinum and 0.01 to 2 weight percent rhenium in a reforming zone at reforming conditions including a pressure of less than 250 p.s.i.g., a liquid hourly space velocity of at least 2, and a maximum hydrogen to hydrocarbon mole ratio of 5.4 when producing a reformate having an F-1 clear octane number of 98, the maximum hydrogen to hydrocarbon mole ratio being increased by about ⅔ mole of hydrogen per octane number as the F-1 clear octane number of the reformate being produced is raised from 98 to 104. At the reforming conditions chosen, particularly with a maximum hydrogen to hydrocarbon mole ratio of 5.4 and more preferably of 5.0, and over the 95% boiling point temperature range of the feed, a reforming process using a platinum catalyst comprising no more than 1 weight percent platinum and having no rhenium present will not be characterized by an on-stream period of at least 2000 hours with a $C_5+$ liquid yield decline of no greater than 2 volume percent over 2000 hours when producing a reformate of at least 98 octane. Thus, referring to point $b$, curve 2 of FIGURE 1, it is seen that reforming a low boiling feed, that is, a feed which has a 95% boiling point temperature of 340° F., with a platinum catalyst having 1.0 weight percent platinum at the most favorable reforming conditions, requires a hydrogen to hydrocarbon mole ratio of at least 5.4 in order to maintain the reforming process for 2000 hours with a $C_5+$ liquid yield decline of no greater than 2 volume percent. With higher boiling feeds, higher hydrogen to hydrocarbon ratios are required. Thus, with a feed having a 95% boiling point temperature of 370° F., a hydrogen to hydrocarbon mole ratio of 8.3 is necessary (see point $c$, curve 2, of FIGURE 1). In order to increase the octane number of the reformate produced while reforming at a pressure of less than 250 p.s.i.g. and an LHSV of at least 2, the hydrogen to hydrocarbon mole ratio must accordingly be increased. For a reforming process using a catalyst comprising platinum without rhenium, the hydrogen to hydrocarbon mole ratio must be increased by at least about ⅔ mole of hydrogen per octane number as the F-1 clear octane number of the reformate is raised from 98 to 104. A smaller increase in the hydrogen to hydrocarbon mole ratio than about ⅔ as the octane number of the product is increased will result in too rapid catalyst fouling, thereby preventing the reforming process from operating on stream for at least 2000 hours with a yield decline of no more than 2 volume percent.

The inventive process can be more fully understood by reference to the following example.

EXAMPLE

A low pressure reforming process using a catalyst comprising approximately 0.6 weight percent platinum and 0.6 weight percent rhenium supported on alumina was compared with a low pressure reforming process using a conventional catalyst comprising 0.7 weight percent platinum supported on alumina.

The supported platinum-rhenium catalyst was prepared by impregnating a previously impregnated platinum-alumina support with an aqueous solution containing perrhenic acid. The catalyst was dried in air at 150° F. for approximately one hour and then heated in air at 700° F. for about one hour. Thereafter the catalyst comprising alumina impregnated with platinum and rhenium was subjected to a hydrogen atmosphere at 700° F. for about one hour to reduce the metals.

The feed used for the reforming processes was a hydrocracked naphtha containing less than 0.1 p.p.m. nitrogen and less than 0.1 p.p.m. sulfur. The feed had a boiling range of approximately 210° F. to 420° F. The temperature at which 95 volume percent of the feed had been distilled during ASTM D-86 distillation was 372° F. The reforming processes were conducted at pressures of 200 p.s.i.g., and liquid hourly space velocities of at least 2. The liquid hourly space velocities for both processes were the same.

The hydrogen to hydrocarbon mole ratio for the reforming process using the platinum catalyst was 6.0. The hydrogen to hydrocarbon mole ratio for the reforming process using the platinum-rhenium catalyst was 8 for the first 1400 hours of operation; at the end of 1400 hours, the hydrogen to hydrocarbon mole ratio was adjusted to a value of 6. The hydrogen to hydrocarbon mole ratio for both processes was less than the value determined from the equation $$\log H_2/HC = 0.0062x - k$$

where $k$ equals about 1.30 since 100 F-1 clear octane gasoline was to be produced.

Reformate having an F-1 clear octane number of 100 was produced throughout the duration of the runs for both reforming processes.

The above comparison between the catalyst containing platinum and rhenium and the catalyst containing only platinum is shown in the appended FIGURES 2 and 3. The change in average catalyst temperature needed in order to maintain the desired 100 F-1 clear octane product is shown in FIGURE 2 and the yield of $C_5+$ gasoline or reformate having an F-1 clear octane rating of 100 is shown in FIGURE 3. It is apparent from FIGURE 2 that the supported platinum-rhenium catalyst maintains high activity throughout the reforming process even at the severe reforming conditions. For the first 1400 hours the process was characterized by a fouling rate of only about 0.015° F. per hour; that is the temperature had to be increased 1.5° F. per 100 hours in order to maintain the conversion to 100 F-1 clear gasoline. This corresponds to a period of operation of at least 2800 hours with a $C_5+$ liquid yield decline of no greater than 2 volume percent over 2800 hours. When the hydrogen to hydrocarbon mole ratio was decreased to a value of 6 after 1400 hours of reforming, the fouling rate increased only slightly. The graph in FIGURE 3 shows the remarkable yield stability of the present low pressure-high severity reforming process using the supported platinum-rhenium catalyst. The $C_5+$ liquid product yield decreased less than one volume percent over 2200 hours on-stream operation.

The reforming process using the catalyst comprising platinum without rhenium, as seen from FIGURE 2, had an exceptionally high fouling rate indicating rapid catalyst deactivation. Furthermore, as seen from FIGURE 3, the $C_5+$ liquid product produced during the reforming process using the catalyst comprising platinum without rhenium decreased significantly over only an on-stream period of operation of 400 hours. Thus, the $C_5+$ liquid product produced during the reforming process using the platinum catalyst decreased 2 volume percent over the 400 hours on-stream period of use.

It is apparent from the above example that the low pressure reforming process of the present invention can operate successfully at a pressure less than 250 p.s.i.g. and a space velocity of greater than 2 to produce high octane gasoline, that is gasoline having an octane number of at least 98, and still have the process characterized by an on-stream period of time of at least 2000 hours with a $C_5+$ liquid yield decline of no greater than 2 volume percent over 2000 hours.

The foregoing disclosure of this invention is not to be considered as limited as many variations can be made by those skilled in the art without departing from the scope and spirit of the appended claims.

We claim:

1. A process for catalytically reforming a naphtha to obtain a reformate having an F-1 clean octane number of at least 98 which comprises contacting said naphtha and hydrogen with a catalyst comprising a porous inorganic oxide carrier containing from 0.01 to 1.0 weight percent platinum promoted with 0.01 to 2 weight percent rhenium at reforming conditions including a pressure of less than 250 p.s.i.g., a liquid hourly space velocity of at least 2.0, and a hydrogen to hydocarbon mole ratio ($H_2/HC$) less than the value determined from the equation $$\log H_2/HC = 0.0062x - k$$

where $x$ is the temperature at which 95 volume percent of said naphtha had been distilled during an ASTM D-86 distillation, and where $k$ depends on the F-1 clear octane number (O.N.) of the reformate being produced according to the equation $$k = -0.038 (O.N.) + 5.10$$

the process being characterized by an on-stream period of at least 2000 hours with a $C_5+$ liquid yield decline of no greater than 2 volume percent over 2000 hours.

2. The process of claim 1 wherein said naphtha is substantially sulfur free.

3. The process of claim 1 wherein said naphtha is a hydrocracked naphtha.

4. The process of claim 1 wherein said carrier contains from 0.2 to 1 weight percent platinum, and from 0.1 to 1.5 weight percent rhenium.

5. The process of claim 1 wherein said liquid hourly space velocity is from 2 to 6.

6. The process of claim 1 wherein said pressure is at least 75 p.s.i.g. but less than 250 p.s.i.g.

7. The process of claim 1 wherein said porous inorganic oxide carrier is alumina.

8. The process of claim 1 wherein said naphtha is reformed to obtain a reformate having an F-1 clear octane number of at least 100.

9. The process of claim 1 wherein the temperature at which 95 volume percent of said naphtha had been distilled during an ASTM D-86 distillation is within the range from 300° F. to 400° F.

10. The process of claim 9 wherein said temperature is within the range from 320° F. to 380° F.

11. A process for catalytically reforming a naphtha, the temperature at which 95 volume percent of said naphtha distilled during an ASTM D-86 distillation being from about 340° F. to about 370° F., to obtain a reformate having an F-1 clear octane number of at least 98, the process being characterized by an on-stream period of at least 2000 hours with a $C_5+$ liquid yield decline of no greater than 2 volume percent over 2000 hours, which comprises contacting said naphtha and hydrogen with a catalyst comprising a porous inorganic oxide carrier containing from 0.01 to 1.0 weight percent platinum promoted with 0.01 to 2 weight percent rhenium at reforming conditions including a pressure of less than 250 p.s.i.g., a liquid hourly space velocity of at least 2.0, and a hydrogen to hydrocarbon mole ratio of less than 5.4 when a reformate having an F-1 clear octane number of 98 is being produced and being increased by about ⅔ mole of hydrogen per octane number as the F-1 clear octane number of the reformate being produced is raised from 98 to 104.

12. The process of claim 11 wherein said carrier is alumina.

13. A process for catalytically reforming a naphtha, the temperature at which 95 volume percent of said naphtha distilled during an ASTM D-86 distillation being from about 340° F. to about 370° F. to obtain a reformate having an F-1 clear octane number of at least 98 which comprises contacting said naphtha and hydrogen with a catalyst comprising a porous inorganic oxide carrier containing from 0.01 to 1.0 weight percent platinum promoted with 0.01 to 2 weight percent rhenium at reforming conditions including a pressure of less than 250 p.s.i.g., and a liquid hourly space velocity of at least 2.0, the process being characterized by an on-stream period of at least 2600 hours with a $C_5+$ liquid yield decline of no greater than 2 volume percent over 2600 hours, and wherein the maximum number of moles of hydrogen per mole of hydrocarbon in the reaction zone required to obtain the long on-stream period which characterizes the process being 5.4 when a reformate having an F-1 clear octane number 98 is being produced and being increased by about ⅔ mole of hydrogen per octane number as the F-1 clear octane number of the reformate being produced is raised from 98 to 104.

References Cited

UNITED STATES PATENTS 3,296,118  1/1967  Czajkowski et al. _____ 208—138

OTHER REFERENCES

Blom et al.: "Ind. & Eng. Chem.," vol. 54, No. 4, April 1962, pp. 16–22.

Blom et al.: "Hydrocarbon Processing and Petroleum Refiner," vol. 42, No. 10 October 1963, pp. 132–134.

HERBERT LEVINE, *Primary Examiner.*

U.S. Cl. X.R.

252—466

UNITED STATES PATENT OFFICE

CERTIFICATE OF CORRECTION

Patent No. 3,434,960                                    March 25, 1969

Robert L. Jacobson et al.

It is certified that error appears in the above identified patent and that said Letters Patent are hereby corrected as shown below:

Column 12, line 16, "clean" should read -- clear --.

Signed and sealed this 14th day of April 1970.

(SEAL)
Attest:

Edward M. Fletcher, Jr.
Attesting Officer

WILLIAM E. SCHUYLER, JR.
Commissioner of Patents